Sept. 21, 1948.   R. C. LANE   2,449,659
QUICK COUPLING FOR HOSE
Filed Aug. 7, 1945
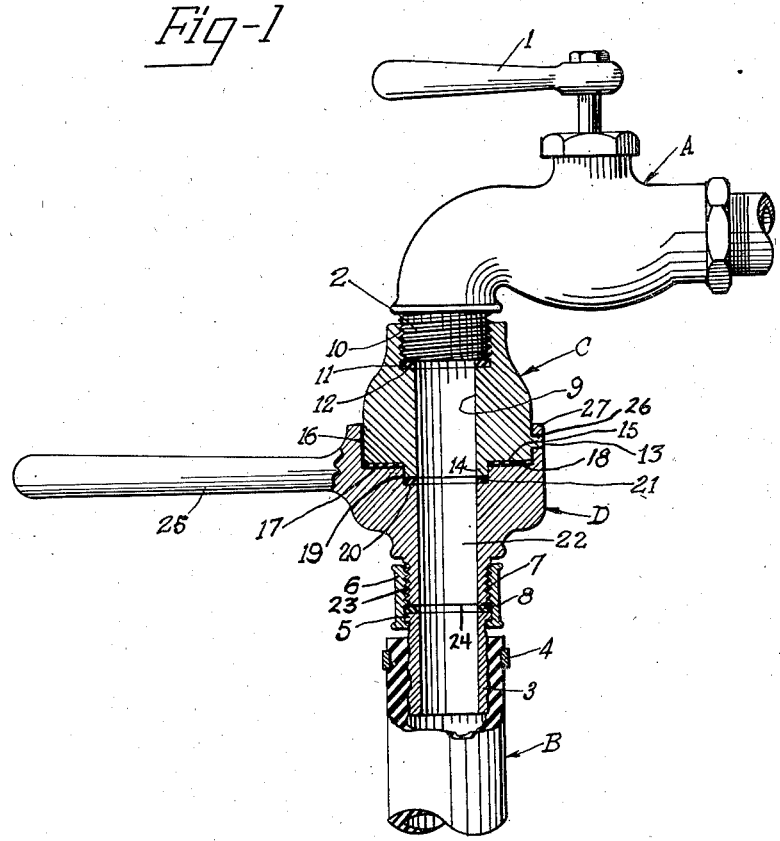
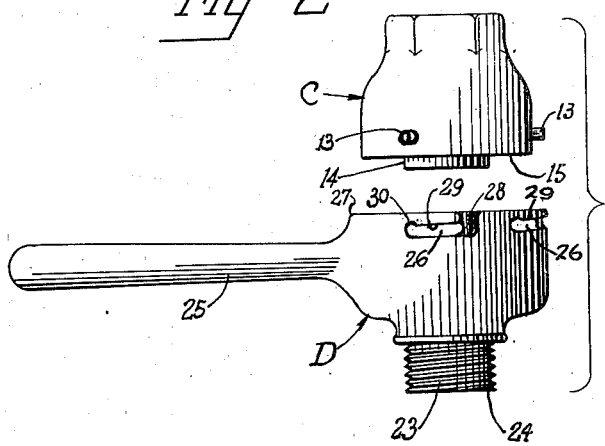
INVENTOR
RUSSELL C. LANE
BY Munn, Liddy & Glaccum
ATTORNEYS Patented Sept. 21, 1948

2,449,659

UNITED STATES PATENT OFFICE 2,449,659

QUICK COUPLING FOR HOSE

Russell C. Lane, San Carlos, Calif.

Application August 7, 1945, Serial No. 609,383

1 Claim. (Cl. 285—175)

The standard garden hose has a rotatable member that may be screwed onto the threaded portion of a faucet for coupling the hose thereto. The rotatable coupling member needs to be firmly attached to the faucet to prevent any leakage and then it becomes difficult to remove when it is desired to change the hose to another faucet, because the coupling member is tightly held in place and is small in diameter so that a strong grip is required to loosen it.

To overcome this disadvantage, I provide a quick coupling for a garden hose which consists of two members, one which is designed to be permanently attached to the faucet and the other designed to be permanently attached to the end of the hose. I provide novel means for quickly securing the two coupling members together so that a watertight connection is made therebetween. The member connected to the hose is provided with a handle to permit sufficient leverage to be applied to the member for connecting it tightly to the faucet member or for disconnecting it therefrom. In actual practice, all of the faucets to which the garden hose is to be connected will be provided with one of the coupling members. This will permit the other member, connected to the garden hose, to be attached to any desired faucet.

A further object of my invention is to provide a device of the type described which is extremely simple in construction and which is durable and efficient for the purpose intended.

Other objects and advantages will appear in the following specification, and the novel features of the device will be particularly pointed out in the appended claim.

My invention is illustrated in the accompanying drawings forming a part of this application, in which:

Figure 1 is a vertical section through the device showing it operatively applied to a faucet and to a garden hose; and Figure 2 is a side elevation of the device showing the coupling parts in separated position.

While I have shown only the preferred forms of my invention, it should be understood that various changes or modifications may be made within the scope of the appended claim without departing from the spirit and scope of the invention.

In carrying out my invention, I make use of a faucet indicated generally at A and a garden hose indicated generally at B. The faucet has the usual handle 1 and an exteriorly threaded portion 2. The garden hose has a nipple 3 secured to its end by a clamping ring 4. The nipple or sleeve 3 has an outwardly extending flange 5 that is rotatably received in a coupling member 6. The member 6 is threaded internally at 7 and is normally designed to be screwed upon the threaded portion 2 of the faucet A for connecting the garden hose thereto. A washer 8 is placed within the coupling member 6 and rests on the flange 5. The parts thus far described are of standard construction and form no part of my invention except in so far as they cooperate with the parts now to be described.

My quick coupling comprises two parts indicated generally at C and D. The part C has a water passage 9 therein and this passage opens into a threaded portion 10 that is designed to receive the threaded end 2 of the faucet A. A washer 11, preferably of the same size as the washer 8, is placed on a shoulder 12 that forms the juncture between the threaded portion 10 and the water passage 9.

Figure 2 shows the part C provided with a plurality of upwardly extending pins or lugs 13. Two or more of these lugs may be provided and I have shown three lugs in the present form of the device. I do not wish to be confined to any particular number of lugs or pins. The part C also has a circular depending flange 14 that extends below the under face 15 of the member C. Figure 1 shows the flange 14 as being concentric with the axis of the water passage 9.

The other part D of the quick coupling has a recess 16 for receiving the lower portion of the part C. The bottom 17 of the recess parallels the bottom 15 of the part C and if desired a washer 18 may be placed between the two surfaces to aid in forming a water tight seal between the parts C and D when they are connected together. The part D has an annular groove 19 for receiving the circular flange 14 and the bottom wall 20 of the groove provides a seat for a washer 21 that is preferably of the same size as the washers 8 and 11.

The part D has a water passage 22 therein and this passage is aligned with the passage 9 when the parts C and D are connected together. Figure 2 shows the lower end of the part D provided with an exteriorly threaded portion 23 that is designed to receive the coupling member 6 of the hose. The passage 22 extends through the portion 23 and its lower edge 24 abuts against the washer 8 to make a liquid tight seal between the part D and the hose B. The part D has a handle 25 extending radially therefrom and of sufficient length to permit the part D to be rotated readily with respect to the part C.

In Figure 2 I show a plurality of bayonet slots 26 extending into the flange 27 forming the cylindrical wall of the recess 16. The slots 26 have entrance openings 28, inclined portions 29 and slightly enlarged ends 30. There are as many bayonet slots 26 in the part D as there are pins in the part C. The slots may extend entirely through the flange 27 or may extend part way through if desired.

From the foregoing description of the various parts of the device, the operation thereof may be readily understood.

The part C or male member of the quick coupling is connected to the faucet A and the part D or female member is connected to the hose B. When it is desired to connect the hose to the faucet, the operator grips the handle 25 and raises the part D so that its recess 16 will be brought into alignment with the bottom of the part C. The handle is then swung angularly for aligning the pins 13 with the entrance openings 28 of the slots 26. The part D is then moved onto the part C for causing the pins to enter the entrances 28 and then the inclined portions 29 of the slots.

The handle 25 is now rotated to the right for causing the pins to ride down the inclined portions 29 and to enter the enlarged recessed ends 30. As the pins ride down the inclined portions 29, the washers 18 and 21 will be compressed slightly and then when the pins enter the enlarged recess 30, the resiliency of the washers will urge the parts C and D away from each other with sufficient force for causing the pins to enter the tops of the recesses and this will tend to lock the part D to the part C and prevent accidental removal. A watertight seal is provided through all of the parts so that a turning of the handle 1 of the faucet will cause water to flow into the hose B.

The hose can be quickly disconnected by swinging the handle 25 to the left for disengaging the pins 13 from the slots. The device is sturdy and will stand up under daily use to which a hose is subjected.

I claim:

A quick coupling for a hose comprising a male member attachable to a water faucet and having outwardly extending pins and a cylindrical flange encircling a passage in the member and extending beyond an end of the member for providing an inner circular rim for a washer-receiving face, a washer encircling the flange and bearing against the face, a female member attachable to a hose and having a flange receiving the male member, the female flange having bayonet slots for receiving the pins, a radially and outwardly extending handle carried by the female member, said female member having a face for bearing against the washer, and having a cylindrical recess for receiving the male member flange, and a second washer placed in the female member recess and bearing against the male member flange to cooperate with the first washer for making a stepped water-tight seal between the male and female members, both washers lying within a cylindrical area bounded by the pins.

RUSSELL C. LANE.

REFERENCES CITED

The following references are of record in the file of this patent:

UNITED STATES PATENTS

| Number | Name | Date |
| --- | --- | --- |
| 450,373 | Ott | Apr. 14, 1891 |
| 607,525 | Schrader | July 19, 1898 |
| 679,005 | Prouty | July 23, 1901 |
| 1,307,273 | Salley | June 17, 1919 |
| 1,890,011 | Wirtz et al. | Dec. 6, 1932 |
| 1,910,152 | Durfey | May 23, 1933 |
| 1,929,190 | Parker | Oct. 3, 1933 |